(12) United States Patent
McMahon et al.

(10) Patent No.: US 7,219,934 B2
(45) Date of Patent: May 22, 2007

(54) PIPE COUPLING

(75) Inventors: John E. McMahon, Currumbin Waters (AU); Richard I. Gellie, Elanora (AU)

(73) Assignee: Tyco Water Pty Limited, Nowra, NSW (AU)

( * ) Notice: Subject to any disclaimer, the term of this patent is extended or adjusted under 35 U.S.C. 154(b) by 194 days.

(21) Appl. No.: 10/513,297

(22) PCT Filed: Apr. 24, 2003

(86) PCT No.: PCT/AU03/00492

§ 371 (c)(1),
(2), (4) Date: Nov. 1, 2004

(87) PCT Pub. No.: WO03/093717

PCT Pub. Date: Nov. 13, 2003

(65) Prior Publication Data

US 2005/0225087 A1 Oct. 13, 2005

(30) Foreign Application Priority Data

May 2, 2002 (AU) .................................... PS2078

(51) Int. Cl.
*F16L 25/00* (2006.01)
(52) U.S. Cl. ................... 285/420; 285/421; 285/367
(58) Field of Classification Search ............. 285/367, 285/368, 420, 421
See application file for complete search history.

(56) References Cited

U.S. PATENT DOCUMENTS

| 1,171,219 | A | * | 2/1916 | Maire .......................... 285/342 |
| 1,547,106 | A | * | 7/1925 | Dutcher ........................ 285/90 |
| 3,129,021 | A | * | 4/1964 | Willis et al. .................. 285/233 |
| 3,252,192 | A | * | 5/1966 | Smith ........................... 269/117 |
| 3,594,023 | A | * | 7/1971 | Yano ........................... 285/337 |
| 3,700,270 | A | * | 10/1972 | Howard ....................... 285/337 |
| 4,083,588 | A | | 4/1978 | Berger |
| 4,119,335 | A | * | 10/1978 | Rieffle et al. ............... 285/337 |
| 4,397,486 | A | | 8/1983 | Ohya |
| 4,640,536 | A | | 2/1987 | Printiss, Sr. et al. |
| 4,702,499 | A | * | 10/1987 | deRaymond et al. ....... 285/112 |
| 4,848,808 | A | | 7/1989 | Pannell et al. |

(Continued)

FOREIGN PATENT DOCUMENTS

DE 29811369 U1 11/1998

(Continued)

*Primary Examiner*—James M. Hewitt
(74) *Attorney, Agent, or Firm*—Daniel N. Daisak

(57) ABSTRACT

A pipe coupling for coupling the ends of pipe sections together end to end, wherein the coupling includes a barrel member, at least one coupling member, at least one elastomeric sealing ring, a tangentially extending bolt and interacting members. The barrel member surrounds the ends of the pipe sections and the coupling member engages an end of the barrel member. The sealing ring is disposed between an end of the barrel member and the coupling member, and expands radially outward and inward to seal within the end of the barrel member and around a circumference of one of the pipe sections. The bolt couples the coupling member to the barrel member. The interaction members interact and progressively twist the coupling member along the barrel member to force the sealing ring into sealing engagement within the barrel member and around the circumference of the pipe sections.

8 Claims, 3 Drawing Sheets

U.S. PATENT DOCUMENTS

| | | |
|---|---|---|
| 4,896,902 A | 1/1990 | Weston |
| 5,131,698 A * | 7/1992 | Calmettes et al. ........... 285/419 |
| 5,246,257 A * | 9/1993 | Kojima et al. .............. 285/112 |
| 6,123,317 A | 9/2000 | Densel et al. |
| 6,129,391 A * | 10/2000 | Rakieski ....................... 285/93 |
| 6,168,210 B1 * | 1/2001 | Bird ........................... 285/337 |
| 6,270,124 B1 * | 8/2001 | Nanko ......................... 285/15 |
| 6,305,719 B1 * | 10/2001 | Smith et al. .................. 285/15 |
| 6,367,849 B1 * | 4/2002 | Tatsuta et al. ............... 285/373 |
| 2004/0036291 A1 * | 2/2004 | Dole .......................... 285/367 |
| 2005/0242585 A1 * | 11/2005 | Dole et al. .................. 285/367 |

FOREIGN PATENT DOCUMENTS

| | | |
|---|---|---|
| EP | 0926414 A2 | 6/1999 |
| FR | 2810716 | 12/2001 |

* cited by examiner

PIPE COUPLING

TECHNICAL FIELD

This invention relates to pipe couplings for joining the ends of pipe sections end to end in pipelines, and more particularly, but not exclusively, for use in replacing burst pipeline sections in water pipelines. The pipe coupling may be for the purpose of joining directly abutting pipe ends, although the coupling is also applicable to the joining of pipe ends of various configurations such as socket and spigot joints.

The invention has been particularly developed for coupling the ends of a replacement pipe section to the ends of an existing pipe after a burst section of pipe has been removed, such as in a water main pipeline extending beneath or adjacent roadways in commercial and/or residential locations.

BACKGROUND ART

In order to replace burst sections of such water supply pipelines, a trench or hole is dug down to and along the burst section of the pipeline. The burst section is then cut out from the pipeline and replaced with a new pipe section which is to be coupled at both ends to the ends of the existing pipeline by couplings.

Known, but not necessarily commonly known, couplings have a barrel section bridging and surroundings the ends of the old and new pipeline sections, with the barrel receiving at both ends elastomeric sealing rings to form a seal between the inside of the barrel and the circumferences of the existing and new pipe sections. The sealing rings are of an axially tapered configuration and are forced into matingly internally tapered ends of the barrel by annular cylindrical coupling members surrounding the respective pipe sections and axially connected by bolts extending through lugs in the coupling members at each end of the coupling and along the length of the barrel. The bolts when tightened progressively force the sealing rings into the opposite ends of the barrel whilst compressing the sealing rings to expand them radially outwardly into tight sealing engagement within the ends of the barrel and radially inwardly into tight sealing engagement around the circumferences of the pipe sections being joined. A similar coupling is used to couple the opposite end of the new pipe section to the adjacent end of the existing pipe section. Multiple axially extending bolts are utilised equally spaced around the coupling to provide an even distribution of force on the sealing rings. There may be up to sixteen, or even more, axially extending bolts.

However, because of the location of the connecting bolts with such known couplings, access to beneath the pipe sections is required when tightening the bolts, thus producing back strain, whilst, because of the number of bolts to be tightened, the task of installing the coupling can be time consuming.

It is therefore an object of the present invention to provide a coupling which overcomes, or at least minimises, the above disadvantages with known couplings, whilst also accommodating different diameters of pipe sections to be coupled and also differences between the diameters of the existing pipe and the diameter of the new pipe section. For example the existing pipe may be a metal pipe and the new replacement pipe section may be PVC having a thinner wall thickness, but providing an internal diameter the same as that of the existing pipe but with a smaller external diameter.

DISCLOSURE OF THE INVENTION

In accordance with the present invention there is provided a pipe coupling for coupling the ends of pipe sections together end to end, said coupling including a barrel member forming part of the end of one of the pipe sections, or adapted to bridge and surround the ends of the pipe sections to be coupled, at least one coupling member, adapted to engage at least one end of the barrel, section, and at least one elastomeric sealing ring adapted to be forced by the or each coupling member into at least one end of the barrel member and expanded radially outwardly and inwardly into tight sealing engagement within the end of the barrel member and around the circumference of the pipe section being coupled, wherein a substantially tangentially extending bolt is utilised to couple the or each respective coupling member to the barrel member, and means on the inside of the or each coupling member, and on the outside of the barrel member, to interact and progressively twist the or each coupling member along the barrel member to force the or each sealing ring into tight sealing engagement with the inside of the barrel member and around the circumference of the or each pipe section being coupled.

With the above defined coupling, only one or two bolts have to be tightened and by positioning them appropriately on top of the pipeline access to beneath the pipeline is not required, whilst an even force is applied to the or each sealing ring.

BRIEF DESCRIPTION OF THE DRAWINGS

One preferred embodiment of the invention will now be described with reference to the accompanying illustrations, in which.

BEST MODES OF CARRYING OUT THE INVENTION

Figure 1:
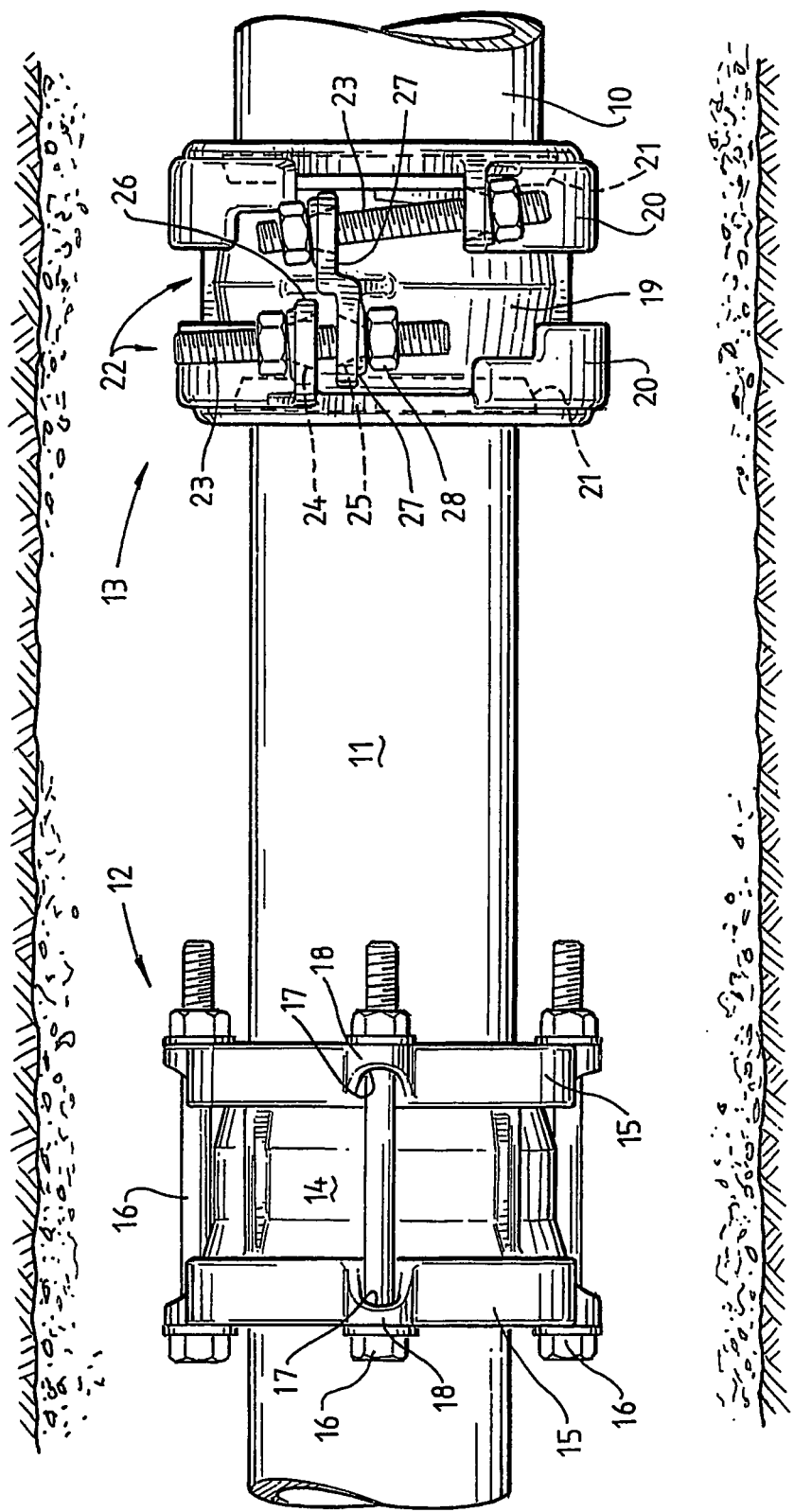
FIG. 1 is a view from above of a replacement pipe section coupled to the ends of an existing pipeline utilising the known prior art pipe coupling at one end and the pipe coupling of the preferred embodiment of the present invention at the other end.
Figure 2:
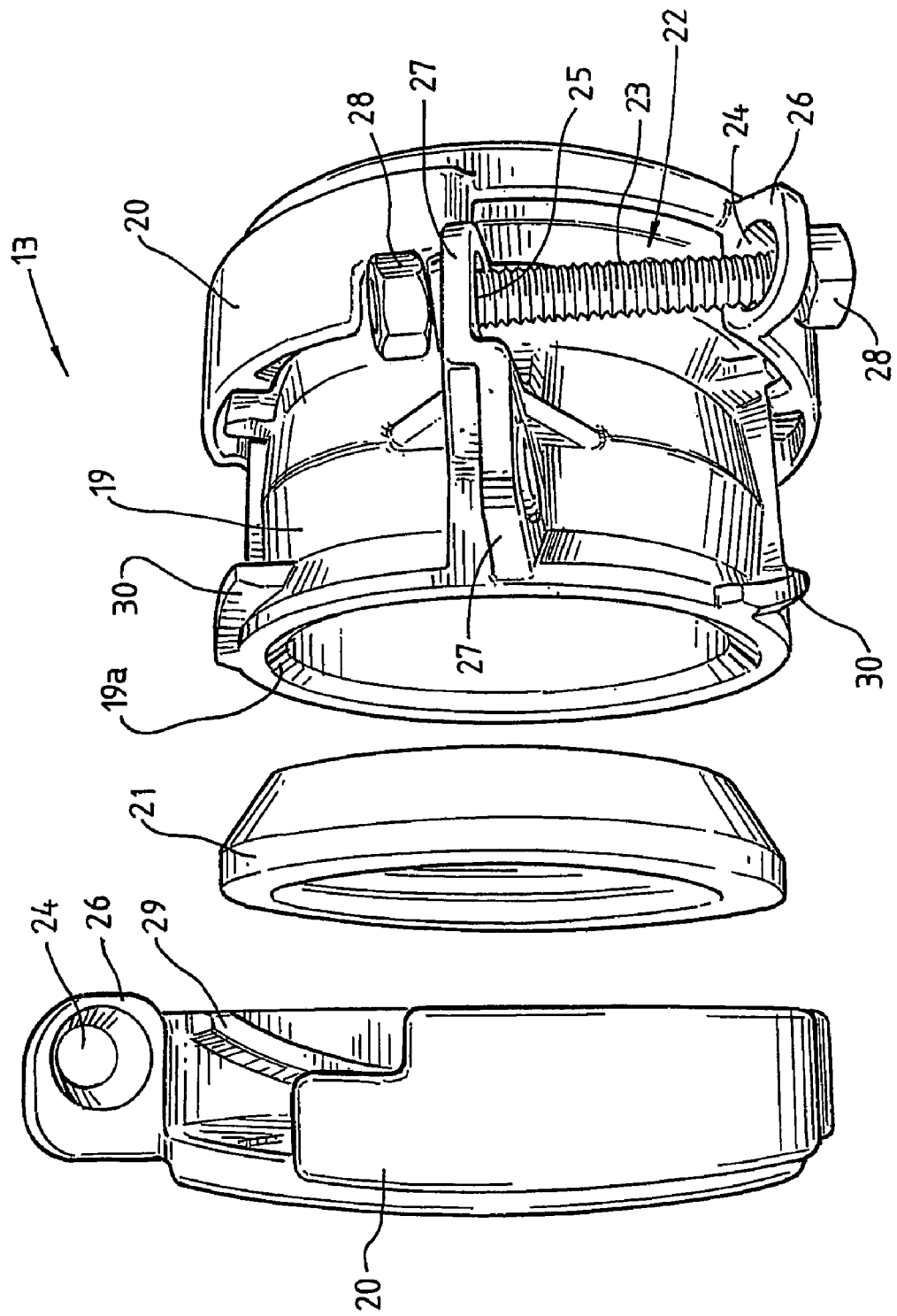
FIG. 2 is a perspective exploded view of the preferred pipe coupling of the present invention.
Figure 3:
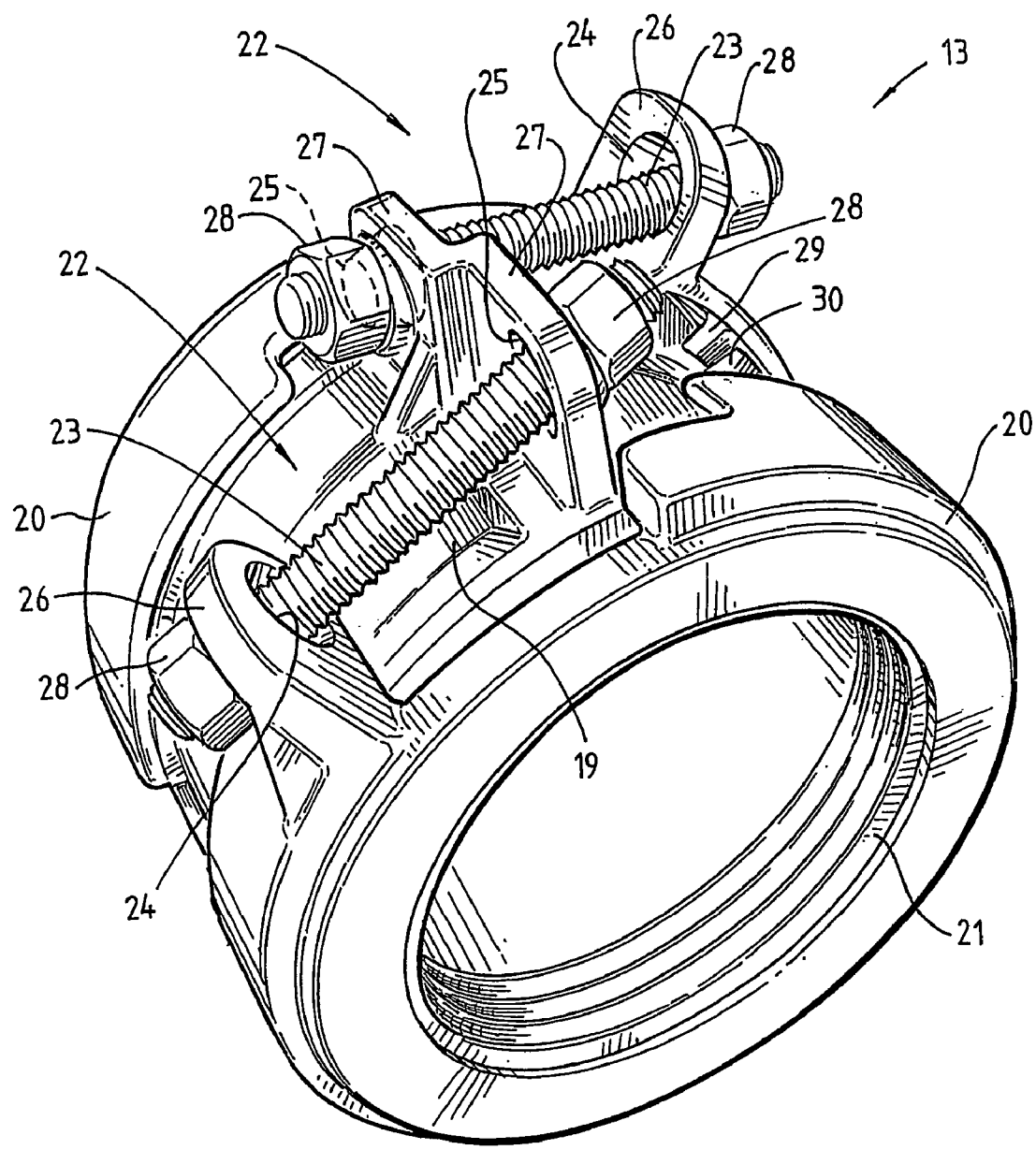
FIG. 3 is a perspective view of the pipe coupling of FIG. 2 is an assembled condition with the pipeline sections omitted.

Turning to the illustrations, and in particular FIG. 1, there is shown an existing pipeline 10 from which a burst pipe section has been removed and replaced by a new pipe section 11. The existing pipeline may be metallic and the new replacement pipe section may be PVC having an internal diameter the same as that for the existing pipeline, but having a smaller external diameter.

The pipe coupling 12 at the left hand end of the illustration is a known form of a coupling, whilst the coupling 13 at the right hand end is a pipe coupling in accordance with the preferred embodiment of the present invention.

The known pipe coupling 12, as described previously, has a barrel member 14 adapted to bridge and surround the ends of the new and old pipe sections 11 and 10 respectively. The barrel member receives elastomeric sealing rings (not shown) within both ends to form seals between the inside of the barrel and the circumferences of the existing pipe section 10 and the new pipe section 11. The sealing rings are of an axially tapering configuration, and are forced into matingly internal tapered ends of the barrel member 14 by annular cylindrical coupling members 15 surrounding the pipe sections 10 and 11. The coupling members 15 are coupled together by axially extending bolts 16 passing through axially aligned holes 17 in outwardly extending lugs 18 carried by the coupling members. As the bolts 16 are progressively tightened, little by little, and in turn, to maintain an even force around the sealing rings, the sealing rings are forced into the ends of the barrel member, whilst axially compressing the sealing rings to expand then radially outwardly into tight sealing engagement within the ends of the barrel member and radially inwardly into tight sealing engagement around the circumferences of the pipe sections 10 and 11. As shown the axially extending bolts 16 are equally spaced (120°) around the coupling.

In contrast, the pipe coupling 13 of this preferred embodiment of the present invention, comprises a barrel member 19 adapted to bridge and surround the ends of pipe sections 10 and 11, and a pair of coupling members 20, one at each end of the barrel member 19. The coupling members 20 engage and axially force and compress a pair of axially tapered elastomeric sealing rings 21 into matingly axially tapered ends 19a of barrel member 19. In order to compress sealing rings 21 so as to expand radially outwardly and inwardly into tight engagement with ends 19a of barrel member 19, and the circumferences of the pipe sections 10 and 11, the coupling is structurally different from coupling 13. In order to move coupling members 20 along the ends of barrel member 19 and compress the sealing rings 21 therebetween, a single substantially tangentially extending bolt system 22 is used for each coupling member 20. Bolt system 22 comprises a threaded shaft 23 extending through aligned holes 24 and 25 in radially outwardly extending lugs 26 and 27 on coupling members 20 and barrel member 19 respectively. Nuts 28 at either end of the threaded shaft 23, when tightened, twist the coupling members, by means of radially inwardly directed lugs 29 on the inside of the respective coupling members 20 engaging radially outwardly directed and helically extending lugs 30 on the outside of barrel member 19. The coupling members 20 move along barrel member 19 and compress the sealing rings 21 which expand radially outwardly and inwardly to form a tight sealing engagement with barrel member 19 and circumferentially around respective pipe sections 10 and 11. Alternatively, the bolts may be conventional bolts of the type having a head on a threaded shaft and nuts at only one end.

Referring to FIG. 1 of the drawings, as coupling member 20 surrounds new pipe section 11 having a smaller diameter than existing pipeline 10, coupling member 20 twists further onto the end of the barrel member 19 before the associated sealing ring 21 radially expands sufficiently to form a tight sealing engagement around new pipe section 11. By providing sufficient spacing between lugs 26 arid 27 various external pipe diameters can be accommodated within the same installation, although the external diameter of the pipes in one installation may be different from those of another installation, as referred to above, the material of the new pipe section may also be different from the existing pipe section.

The barrel member 19 and coupling member 20 of coupling 13 may be formed from ductile iron castings. The elastomeric sealing rings 21 may be formed from conventional materials to achieve the desired sealing functions.

It should be noted that the tightening of bolt 16 required in the known pipe coupling requires a spanner to be swung in a substantially vertical plane (transversely of the pipeline axis), including down towards the bottom of the trench or hole. This inhibits downward movement unless there is sufficient space beneath the pipeline. With the present invention the spanner or spanners are swung in the axial direction (longitudinally of the pipeline), and if the bolts are above the pipeline as in the case of the present invention, access (trench or hole depth) to beneath the pipeline does not inhibit spanner operation.

Although in the preferred embodiment described above the pipe coupling utilises two coupling members 20 and two elastomeric sealing rings 21, the barrel member 20 in a new pipeline installation could alternatively be formed integrally with the end of one of the pipe sections (which may be a socket type configuration to receive spigot and configuration of the pipe section to be joined thereto) whereby only one coupling member and one elastomeric sealing ring are required to complete the coupling.

The invention claimed is:

1. A pipe coupling for coupling the ends of pipe sections together end to end, said coupling comprising:
    a barrel member adapted to bridge and surround the ends of said pipe sections;
    at least one coupling member, adapted to engage a first end of said barrel member;
    at least one elastomeric sealing ring disposed between said first end of said barrel member and said at least one coupling member, said sealing ring configured to expand radially outward and inward to form a sealing engagement within said first end of said barrel member and around a circumference of at least one of said pipe sections;
    a substantially tangentially extending bolt coupling said at least one coupling member to said barrel member; and
    an interaction means, located on an inside of said at least one coupling member, and on an outside of said barrel member, to interact and progressively twist the at least one coupling member along said barrel member to force said sealing ring into sealing engagement within said barrel member and around the circumference of each of said pipe sections.

2. A pipe coupling as claimed in claim 1, wherein said at least one coupling member is a first coupling member and said at least one elastomeric sealing ring is a first elastomeric sealing ring, said pipe coupling further comprising:
    a second coupling member; and
    a second sealing ring disposed between a second end of said barrel member and said second coupling member, said second sealing ring configured to expand radially outward and inward to form a sealing engagement within said second end of said barrel member and around a circumference of at least one of said pipe sections, whereby when the pipe coupling is assembled between the ends of said pipe sections and each coupling member is coupled to its adjacent end of said barrel member by said tangentially extending bolt associated with each coupling member, each sealing ring expands radially outwardly and inwardly into tight sealing engagement within said barrel member and around the circumferences of said pipe sections.

3. A pipe coupling as claimed in claim 1, wherein said interaction means further comprises one or more radially outwardly directed and helically extending lugs located on the outside of said barrel member engaged by one or more radially inwardly directed lugs located on the inside of said coupling member.

4. A pipe coupling as claimed in claim 3, wherein said bolt extends between said radially outwardly directed lugs on the coupling member and said barrel member.

5. A pipe coupling as claimed in claim 1, wherein said elastomeric sealing ring has an axially tapering configuration and said first end of said barrel member has a corresponding internally tapering such that said sealing ring and said barrel member form a seal therebetween.

6. A pipe coupling system comprising:
   a first and second pipe section each having a first end,
   a barrel member adapted to bridge and surround the ends of said pipe sections;
   at least one coupling member, adapted to engage a first end of said barrel member;
   at least one elastomeric sealing ring disposed between said first end of said barrel member and said at least one coupling member, said sealing ring configured to expand radially outward and inward to form a sealing engagement within said first end of said barrel member and around a circumference of at least one of said pipe sections;
   a substantially tangentially extending bolt coupling said at least one coupling member to said barrel member; and
   an interaction means, located on an inside of said at least one coupling member, and on an outside of said barrel member, to interact and progressively twist the at least one coupling member along said barrel member to force said sealing ring into sealing engagement within said barrel member and around the circumference of each of said pipe sections.

7. A pipe coupling system as claimed in claim 6, wherein said barrel member is integrally formed with said first pipe section.

8. A pipe coupling system as claimed in claim 6, wherein said barrel member is integrally formed with said second pipe section.

* * * * *